United States Patent [19]
Baldwin

[11] Patent Number: 5,288,146
[45] Date of Patent: Feb. 22, 1994

[54] ROCKING, ROLLING COMPOSTERS

[76] Inventor: Stephen P. Baldwin, 943 Lowell Rd., Concord, Mass. 01742

[21] Appl. No.: 769,122

[22] Filed: Sep. 30, 1991

Related U.S. Application Data

[63] Continuation-in-part of Ser. No. 498,002, Mar. 23, 1990.

[51] Int. Cl.⁵ .......................... B01F 11/00; B01F 9/02
[52] U.S. Cl. ...................... 366/219; 366/237; 366/239
[58] Field of Search ............... 366/219, 239, 209, 210, 366/234, 225, 226, 233, 235; 422/209, 210, 193; 71/8–14; 241/70

[56] References Cited

U.S. PATENT DOCUMENTS

| | | | |
|---|---|---|---|
| 67,801 | 8/1867 | Rawdon et al. | 366/239 X |
| D. 269,046 | 5/1983 | Faul | D34/4 |
| 1,231,247 | 6/1917 | Freeman | 366/225 |
| 2,322,189 | 6/1943 | Cole | 366/225 X |
| 3,235,369 | 2/1966 | Eweson | 71/12 X |
| 3,248,175 | 4/1966 | Emmet | 71/14 X |
| 3,942,769 | 3/1976 | Whiteside et al. | 366/192 |
| 3,989,499 | 11/1976 | Jetzer | 71/9 |
| 4,042,219 | 8/1977 | Terry | 366/142 |

Primary Examiner—Stuart S. Levy
Assistant Examiner—Kevin M. Watkins
Attorney, Agent, or Firm—Nields & Lemack

[57] ABSTRACT

This invention involves a cylinder of circular section, with one end raised about 5 degrees above the other, and capable of being rolled back and forth through an arc of approximately 210°, 105° in either direction from a central position, or in some cases for complete revolutions, into which trash, garbage, and possibly septage are introduced repeatedly through a hole in the top of the high end when the cylinder is in the central position, and then the cylinder is rocked from one extreme position to the other so that the material inside is tumbled upon itself and aerated and randomly dispersed, and by repeatedly falling tends to progress from the high, input end toward a discharge opening in the low end as digested compost. These units can be built by any reasonably competent mechanic. The smaller ones require a cold chisel, electric drill, and ideally a saber-saw or acetylene torch. The larger ones will require some welding.

10 Claims, 17 Drawing Sheets

ROCKING, ROLLING COMPOSTERS

This application is a Continuation-In-Part of application Ser. No. 07/498,002 filed Mar. 23, 1990.

BACKGROUND OF THE INVENTION

1. Filed of the Invention

The invention relates to rocking, rolling composters. Mechanical rotation has long served to replace the manual labor of turning over a pile of compost. Such composters are becoming needed in various towns in the United States of America, and they are also needed in third-world areas.

2. Description of the Related Art

Prior art composting units include such units as those disclosed in U.S. Pat. No. 3,942,769 to Whiteside, et al. Prior art composters are batch composters, with drums supported on stands. One problem with such units is that the addition of small amounts of new or raw garbage necessitates delay in removing the composted mass.

SUMMARY OF THE INVENTION

The invention comprehends the use of readily available materials to build composters which mix compost by rolling back and forth. The advantages of these several designs are these:

1. Minimal effort needed to turn and aerate the composting mass
2. Protection of compost from rodents and pets
3. Continuous, progressive action in contrast to batch process of prior art units
4. Easy introduction of water, and draining away of excess water
5. Discharge of finely comminuted product into a shallow pile for shoveling into containers or for immediate use in the garden.

Basically, the idea is to feed the waste material into an opening at one end of a long cylinder, and to move the working compost toward the discharge hole in the other end by raising the input end about 10% of the length, while rocking the cylinder about 120°, first to one side, and then to the other, before returning it to the neutral, central station. The raising can be uniform and constant in the case of ordinary compost, or it can be from a horizontal, central station to full lift at 90° or 120° of rotation. The return to horizontal may be useful to retain the liquid component of septage during co-composting. (Co-composting is that which accepts septage with other materials.)

The composter of the invention makes use of tanks and drums of generally cylindrical configuration which are available from various sources. The composter of the invention comprehends a combination of such a tank or drum with a support for the intake end of the tank. The support has two functions. One function is to maintain the input end of the tank in a raised position, so that the effect of gravity is to move the contents of the tank from the input end to the output end, and this effect of gravity is augmented by any rolling motion of the tank. The second function of the support is to permit rolling motion of the tank, with or without raising or lowering the input end as the rolling motion progresses.

There are two basic embodiments of the invention. In one embodiment the support is affixed to the ground, and rolling motion occurs between the tank and the support. In the other embodiment the support is affixed to the tank, and rolling motion occurs between the support and the ground. In general, if the support is affixed to the ground the upper surface thereof will have a radius of curvature having a value or values between the radius of the tank and a plane surface, the latter arrangement providing no lifting action, and the amount of lifting action increasing as the radius of curvature of the upper surface of the support is reduced. In general, if the support is affixed to the tank, the lower surface of the support will be curved and will have a radius of curvature having a value or values between the radius of the tank and a plane surface, the former arrangement providing no lifting action, and the amount of lifting action increasing as the radius of curvature of the lower surface of the support is increased. If the support is affixed to the ground, immobility results when the radius of curvature of the upper surface of the support equals the radius of the tank; and if the support is affixed to the tank, immobility results when the radius of curvature of the lower surface of the support is a plane surface.

I picture that the variable raising of the input end can be accomplished in one of two ways:

1. The input end of the cylinder rolls up an incline like an open book, while at the discharge end, the book is fully opened into a flat surface. The weight of the composter may be supported by the warped surface between the two ends.
2. The cylinder has a wheel fastened eccentrically to the input end. The location and the diameter of the wheel determine the elevation, if any, in the central station, and the elevation at the two extreme stations.

A "flat" at one or both extreme stations would provide a detent for deliberate holding of the cylinder in that raised station.

Each design incorporates the structural stiffeners for safety, and mechanisms to keep the device from "walking" off its site. The rolling can be induced by hand on the wheel of the small unit (already proven), and by cables fastened to the circumference of the large units. Slots, cut into the "waist-line" of the cylinder in the central station, or ridges-plus-holes will trap rain, and direct it into the cylinder where needed.

Unlike prior art composters, the invention provides continuous treatment. One end of the cylinder is on a support which is curved or shaped like an open book. A lip may be provided at the lower end of the cylinder to prevent sliding, or a cable may be provided at the upper end of the cylinder for this purpose. A large-size unit may include a 5000 gallon underground fuel tank; when these start to leak, they are condemned and the owner must remove them. Thus there is a good supply available. The steel in these units is only ½ ton, and so the salvage value is low. They are 24 feet long and 6 feet in diameter. They are thus good materials for use in constructing a town compost unit, which must be big. A "turning" operation is conducted periodically, such as every few days or every few weeks. Each "turning" operation involves rocking the cylinder back and forth a few times, perhaps as little as a couple of times. On the big units it would take 3-6 weeks for garbage to go all the way through from the input end of the cylinder to the output end.

The chemical action during composting is that of air, water and the stuff, which is mostly carbon (newspaper) and nitrogen (vegetables, sewerage, holding tanks in boats); a ratio of 20 C to 1N is best.

As indicated above, the rocking operation is not continuous. After a "turning" operation, it is necessary to wait for chemical action to peak, and then the next "turning" operation is performed. "Turning" or "rocking" is done every week or three. Usually rocking is done more than once each time, although in some cases once each time would be enough.

DESCRIPTION OF THE PREFERRED EMBODIMENTS

Figure 1:
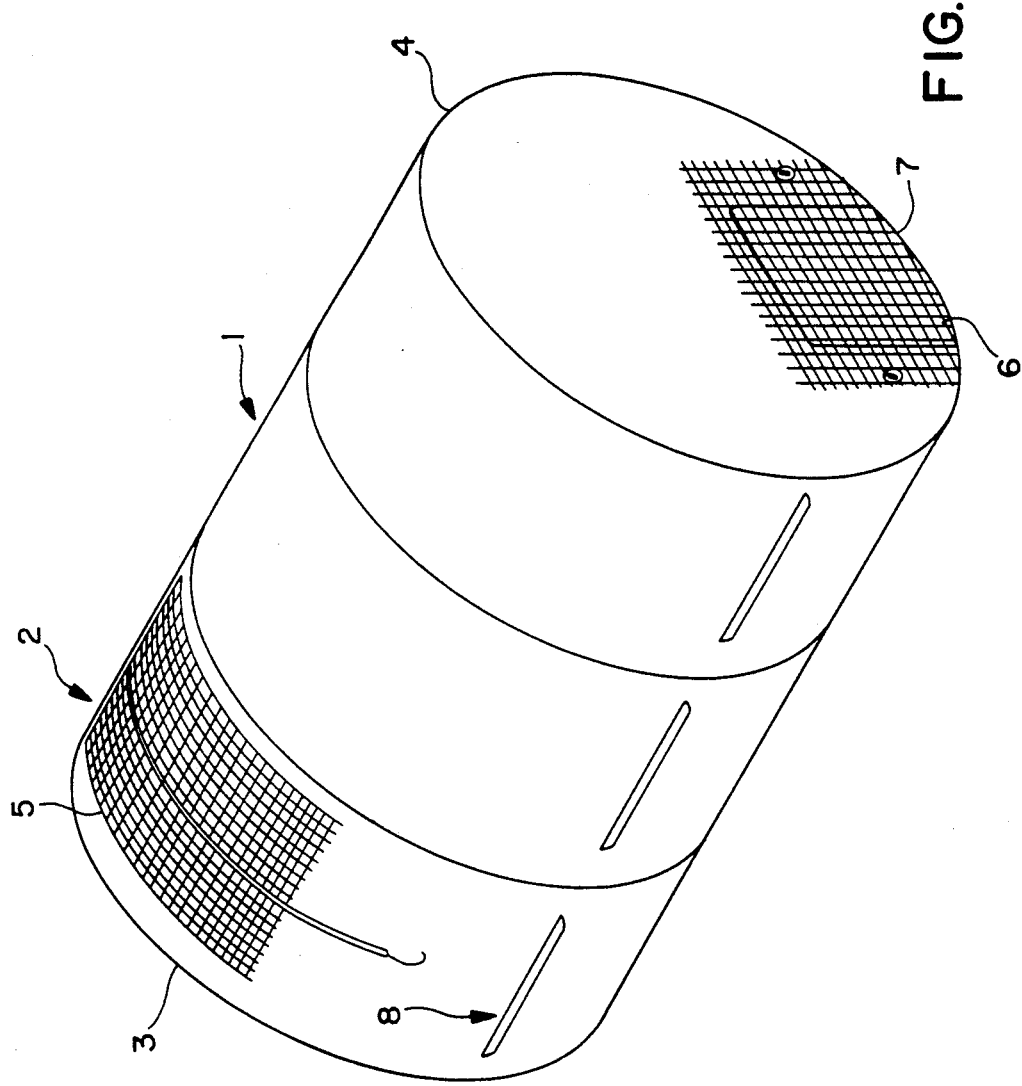
FIG. 1 is an isometric view of a single barrel unit.

Referring to the drawings, and first to FIG. 1 thereof, therein is shown a single unit made from a single oil barrel 1, to be rolled on a level surface, with no elevation of either end. Throughput is assured by a top-loading opening or intake 2 in the cylindrical wall near one end 3, and discharge through a V-shaped opening in the other flat end 4. Both openings would be screened to keep out vermin. For example, the intake aperture might be provided with a cover 5 having wire mesh secured with shock cord. The discharge aperture 6 might be a fair-sized hole covered with hardware cloth 7 of one-half-inch wire mesh, held on with sheet metal screws. In addition, slots 8 for collection of rainwater might be provided; these would be arranged at about the half-way point between the uppermost and lowermost portions of the tank, and would be horizontally disposed. Below these, and near the lowermost portion of the tank, as well as near the lower end thereof, a discharge slot (not shown) for liquid might be provided. This discharge slot should be narrow enough to exclude rats. In constructing a "low-tech" model, one might use a cold chisel to cut through the thin parts of the barrel along the center line between the circular supports; then flare the metal out to get a lip under an aperture to collect rain; at this part of the circumference of the barrel the falling rain would produce no splash. The slits might be 12 inches long. This unit would be suitable for a single household.

Figure 2:
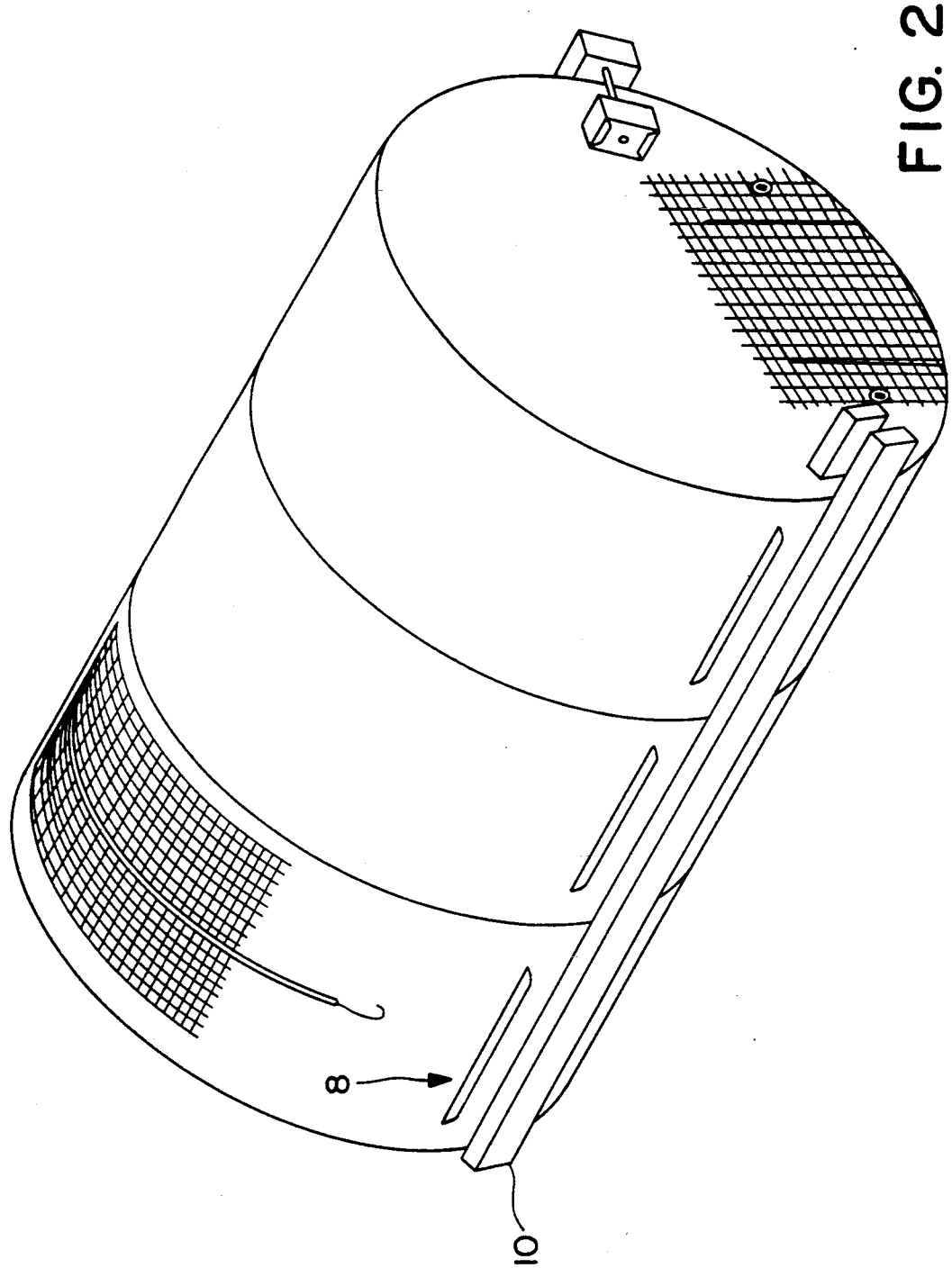
FIG. 2 is a view similar to that of FIG. 1 and showing a modification thereof.

FIG. 2 shows a modification of the device of FIG. 1, wherein two-by-fours 10 are provided between the row of rain-collecting slots 8 and the liquid discharge slot (not shown). The two-by-fours are arranged in pairs, one member of each pair being inside the tank and the other member being outside the tank, the members of each pair being held together at the ends thereof outside the barrel or tank.

Figure 3:
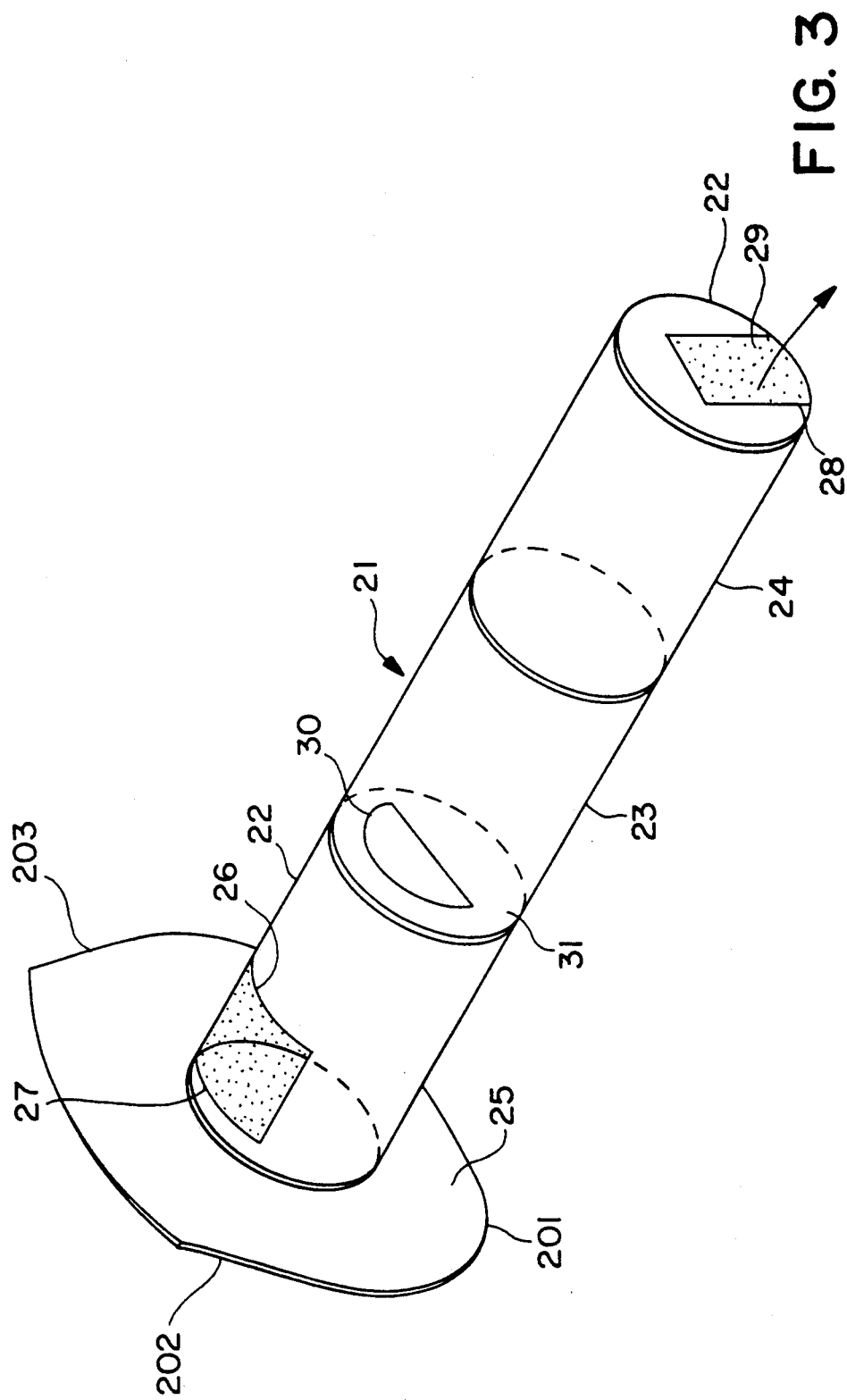
FIG. 3 is an isometric view of a three-barrel unit.

Referring now to FIG. 3, therein is shown a longer unit 21 assembled from three barrels 22, 23, 24, with a plywood (or steel) plate 25 approximately in the shape of a segment of a wheel of a large, non-concentric radius, like a rocking chair, bolted (or welded) to the input end of the first barrel 22 to provide a permanent slope for the material to slide on, and a tendency to return to a central position, like a pendulum. Assuming the rocking surface to be a segment of a circle, adjacent surfaces vertically disposed when the wheel is in its neutral position would permit rotation of 90° on either side of vertical. If the adjacent surfaces are each inclined 30° from vertical, the permissible rotation would increase to 120° on either side of vertical. An intake 26 at the input end of the first barrel 22 is provided with a screen cover 27; the cover 27 might be removed while garbage is dumped into the intake 26 and then replaced. A discharge opening 28 may be provided with a cover 29 having wire mesh secured by shock cord or sheet metal screws, which would seldom be removed. Openings 30 between barrels are in the upper half of the end-walls 31 of the middle barrel(s) so that the material falls over each wall into the next barrel. The reason for keeping any wall between barrels is to keep the biomass as deep as possible. We are limited to the 22-inch diameter of the barrels, but their omnipresence throughout the earth prompts their selection as our basic raw material. This unit could serve several homes in a neighborhood, or a restaurant. It may comprehend a number of barrels other than three, preferably from two to six barrels for serving several homes, or a restaurant.

Figure 4:
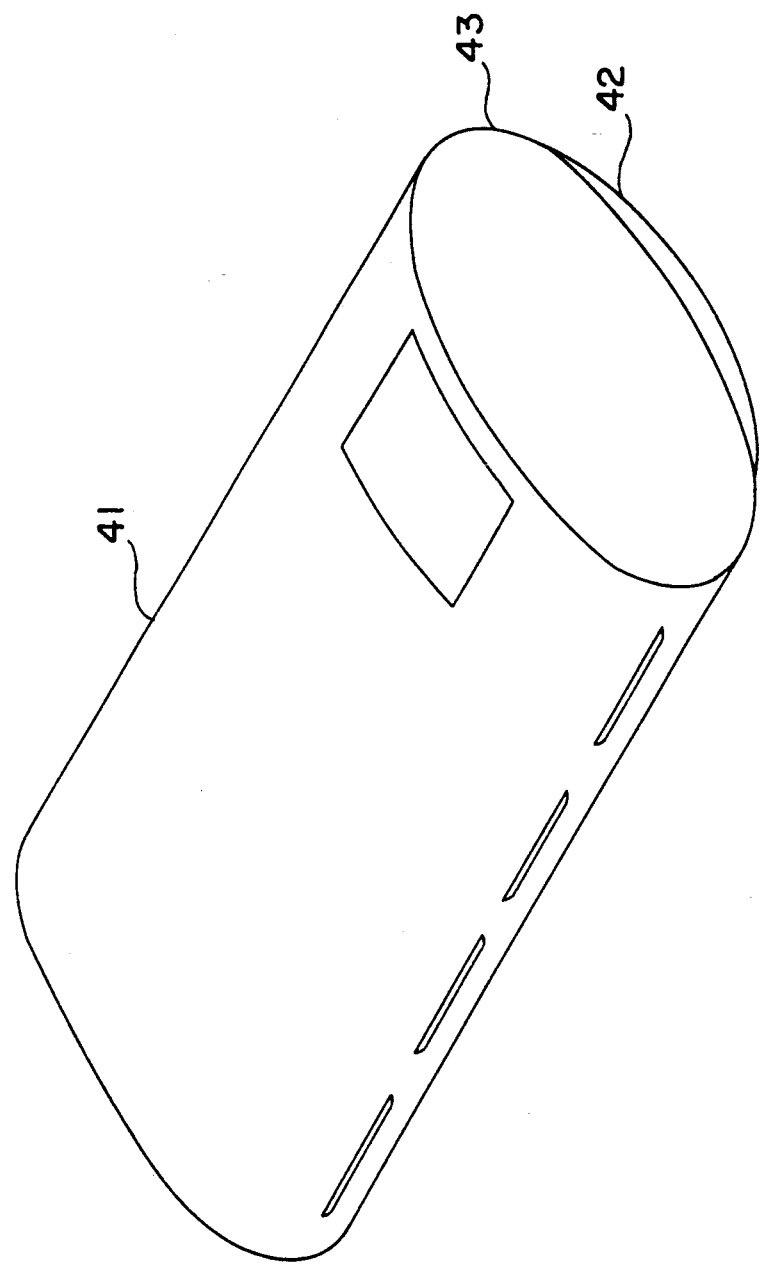
FIG. 4 is an isometric view of a 275-gallon tank unit.

Referring now to FIG. 4, therein is shown a 275-gallon steel, fuel oil tank 41, lying on one flat side, and rocked up in both directions. Rocking movement is provided by a circular rocker 42 bolted in place. It may not be necessary to tilt the input end 43, but it would be easy to add one 6-inch high rocker for this purpose.

Figure 5:
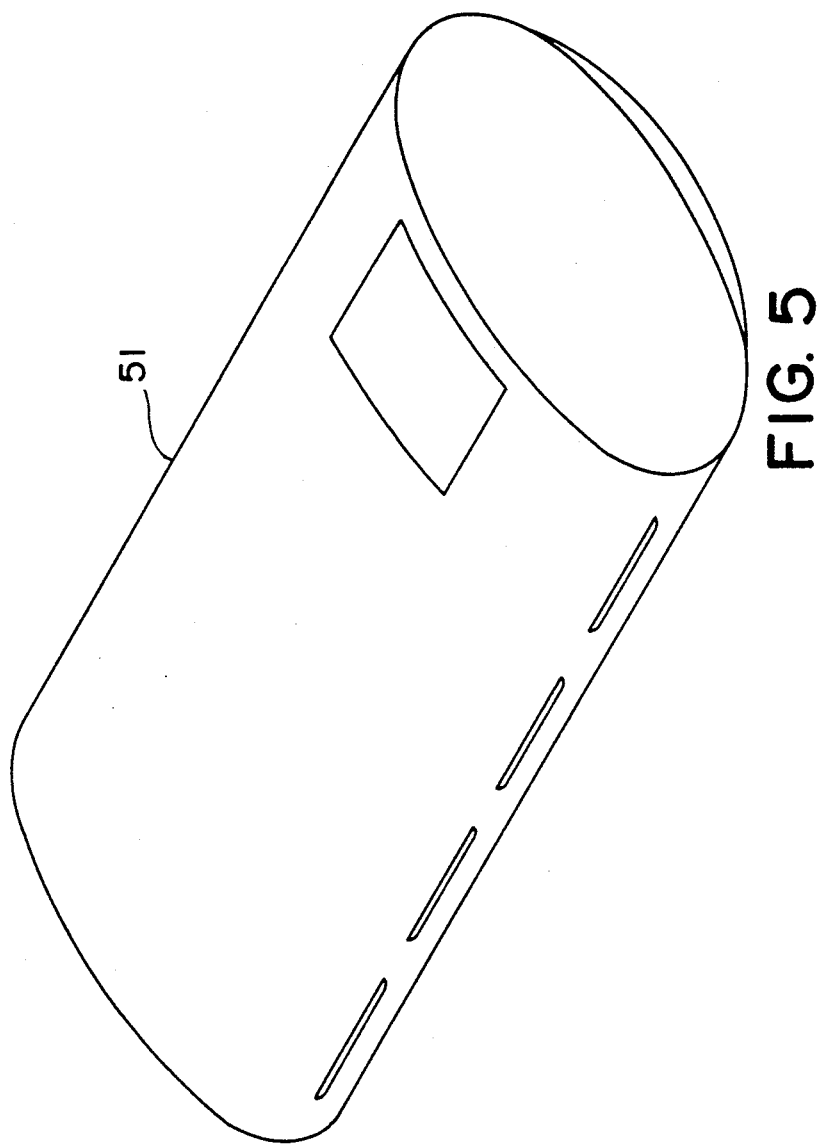
FIG. 5 is an isometric view of an oil-truck-tank unit.

The elliptical tank from a fuel truck might make a good unit, as shown at 51 in FIG. 5, with or without the extra wheel on one end. Inside, pieces of angle could be bolted or welded to provide steps to keep the biomass from sliding around without undergoing thorough tumbling, mixing, and aerating. A few semicircular partitions could be left in or welded or bolted in place to force the material to pile up to a suitable depth of perhaps 3 feet. A unit of this nature will require facilities not available in remote areas. Rocking movement may be provided by a front-end loader or tractor.

Figure 6:
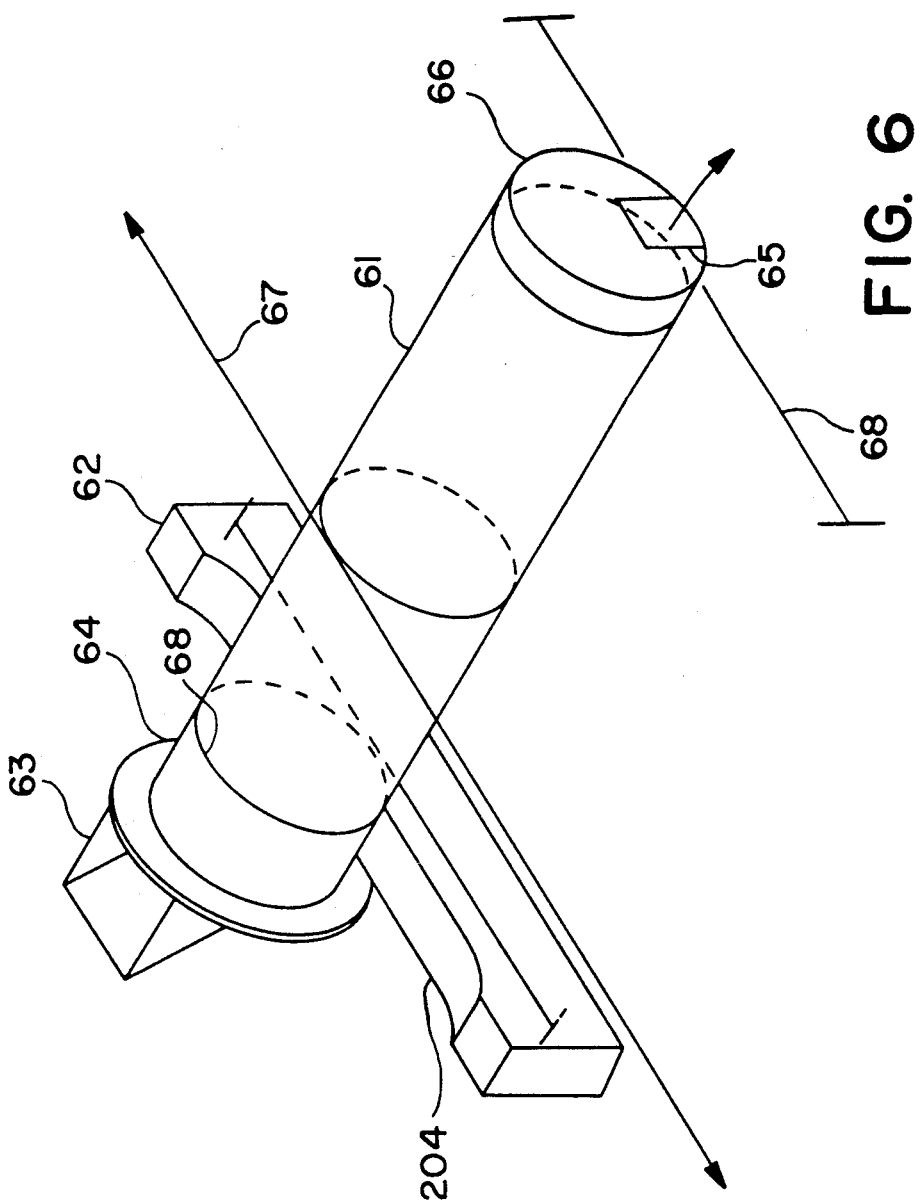
FIG. 6 is an isometric view of an underground fuel tank unit.

Referring now to FIG. 6, therein is shown a large, welded unit 61 made from a discarded, condemned fuel tank(s), three feet or more in diameter, and at least 10 feet long. Although this unit might also have an elliptical, "rocking chair" wheel welded to the input end in the gravity-feeding tilt along the lines of the 3-barrel unit of FIG. 3, with rocking movement provided by a tractor, and stops affixed to the tank to limit the amplitude of the rocking movement, an alternate configuration is shown in FIG. 6.

FIG. 6 illustrates a configuration for providing rocking motion by a separate member, not attached to the tank. For simplicity of explanation, it may be assumed that the barrel or fuel tank 61 is 24 feet long with a 6 foot diameter. The dimensions of the support 62 for the input end of the barrel or fuel tank might then be such that the length thereof is 14 feet, the height of the central portion about 2.5 feet, the height of the extremities about 3 feet, and the width of the support about 1.5 feet. The upper surface of the support might be shaped as shown in FIG. 6, or might be predominantly a V-shape with planar surfaces inclined at about 10° to the horizontal, connected at the apex by a circular surface of relatively large radius of curvature, each extremity comprising a lip connected to the planar surface by a curved surface of moderate radius of curvature.

In the arrangement shown in FIG. 6, the intake comprises a chute 63 into which garbage is dumped and through which the garbage thus dumped passes through a suitable aperture in the intake end 64 of the tank to the interior thereof. A suitable discharge aperture 65 is provided at the opposite end 66 of the tank. The shape of the upper surface of the support 62 determines whether the head end 64 of the tank rolls with or without rising or falling. The shape shown in FIG. 6 would cause the drum to roll without rising or falling (except possibly at the extremities of its motion), and the V-shaped alluded to hereinabove would cause the tank or drum 61 to roll with a rising and falling motion.

Rolling motion is imparted to the tank by suitable motive power, such as a truck, or manual labor. Such motive power is applied to pull a drive cable 67 which surrounds the tank at least once, and preferably several times. The ends of the drive cable may be affixed to the ground or attached directly to the motive power source. If affixed to the ground, the motive power is nevertheless applied by pulling the cable away from the tank, first at one side of the tank in one direction and then at the other side of the tank in the other direction. Such an arrangement provides a two-to-one mechanical advantage. In order to avoid skewing of the orientation of the tank during repeated rolling motion, suitable cables 68 should be provided not only at the input end of the tank, but also at the bottom end of the tank and perhaps positions intermediate of the two ends. Two such stabilizing cables are shown in FIG. 6. Each such cable may be affixed to the tank at approximately its midpoint by means of an eye-bolt affixed to the tank wall, and the two ends of the cable may be affixed to the ground. Each cable surrounds the tank at least once, and preferably several times.

The arrangement shown in FIG. 6 may be used with tanks having a capacity of 5000 gallons, or with similar tanks having a length-to-diameter ratio of about four-to-one. The one-barrel unit of FIGS. 1 and 2 have a length-to-diameter ratio of about two-to-one, and in general the invention may be used with drums or barrels having a length-to-diameter ratio between two-to-one and ten-to-one.

Figure 7:
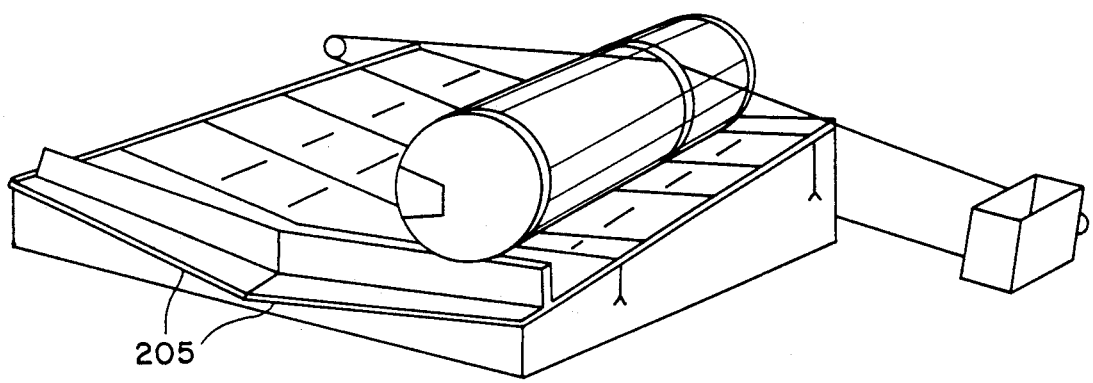
FIG. 7 is an isometric view of a modification of the unit of FIG. 6.

The arrangement of FIG. 6 provides rocking motion by the configuration of the support for the barrel or tank, without modifying the configuration of the barrel or tank. In the arrangement of FIG. 6 there is no support for the mid region of the barrel or tank, and undue stresses are likely. Accordingly, a more suitable support is provided by supporting the tank entirely on the ground, and configuring the surface of the ground by suitable fill, etc., as shown in FIG. 7. Such a configuration may take the shape of an open book at the input end of the tank, and gradually change to a flat surface at the output end of the tank. Thus a sloping platform of a warped surface may be provided to support the entire length of a 24-foot-long tank, and it may be sloped about 18-inches along the 24-foot length. This slope will ensure that the wet garbage will tumble steadily toward the discharge end. The two halves of the platform may be tilted like an open book to provide restoring force to center it in a neutral position. Proper parallel alignment of the tank should be maintained with two steel cables, one at each end, anchored to the edges of the platform. (Without these, it will tend to get skewed and to climb up over the flange) The tendency to slide down the sloping platform, (or ramp) may be resisted with a steel flange at the lower end. The tank may be rotated a total of about 300° to rock it with a winch and cables using a reversible motor or transmission. Discharge occurs through an opening in the lower end. The tank may be stiffened, and tumbling baffles may be provided with steel T-beams (or timbers) inserted through holes in the ends and welded (or lag-screwed) to the tank.

Figure 8:
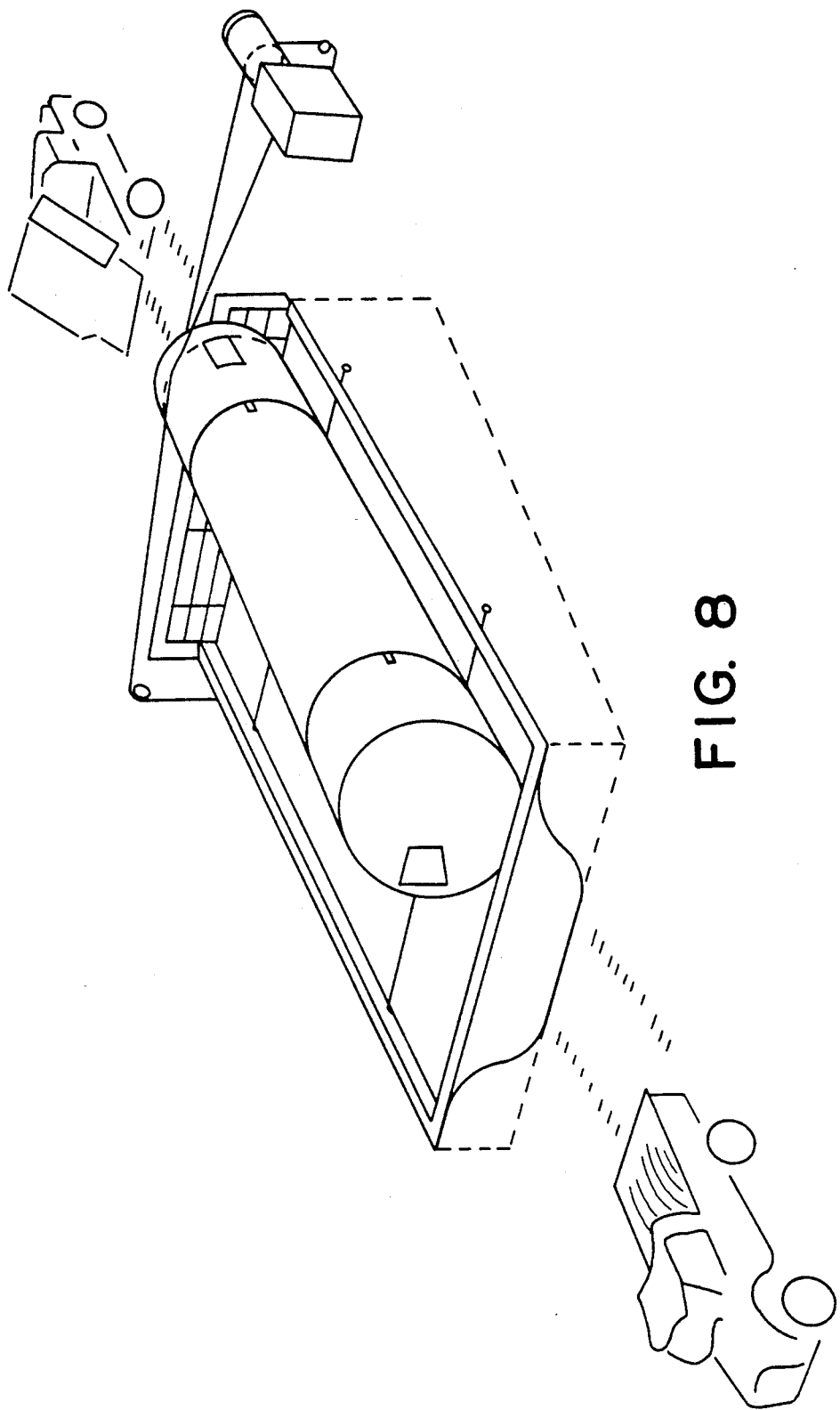
FIG. 8 is an isometric view of a modification of the unit of FIG. 7.
Figure 9C:
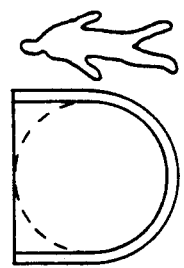
FIG. 9C is an end view of the apparatus of FIG. 9A.
Figure 9D:
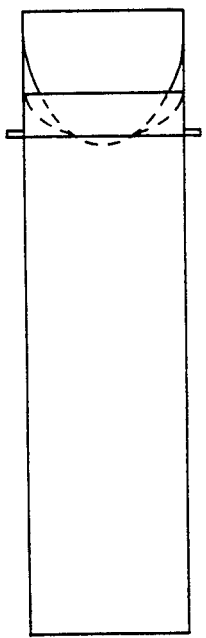
FIG. 9D is a plan view of the apparatus of FIG. 9A.
Figure 9E:
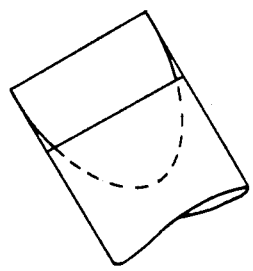
FIG. 9E is a detail of the apparatus of FIG. 9A.
Figure 9A:
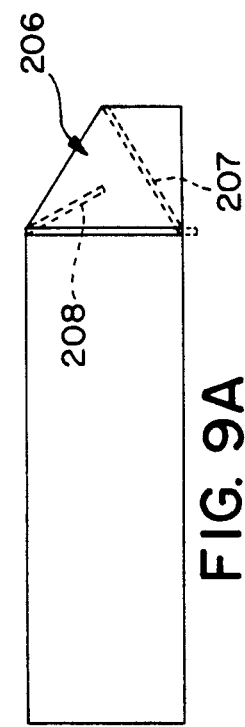
FIG. 9A is a side view of a modification of the apparatus of FIG. 6.
Figure 9B:
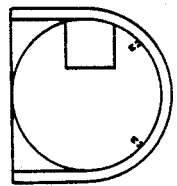
FIG. 9B is an end view of the apparatus of FIG. 9A.
Figure 10C:
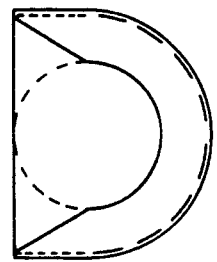
FIG. 10C is an end view of the apparatus of FIG. 10A.
Figure 10D:
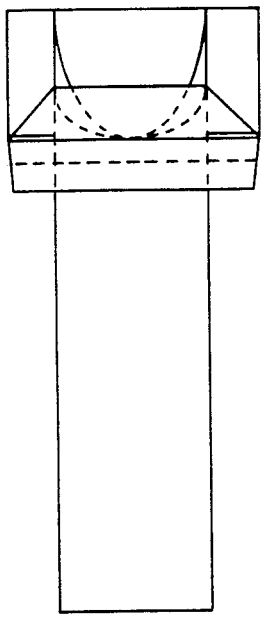
FIG. 10D is a plan view of the apparatus of FIG. 10A.
Figure 10E:
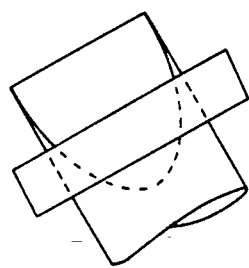
FIG. 10E is a detail of the apparatus of FIG. 10A.
Figure 10A:
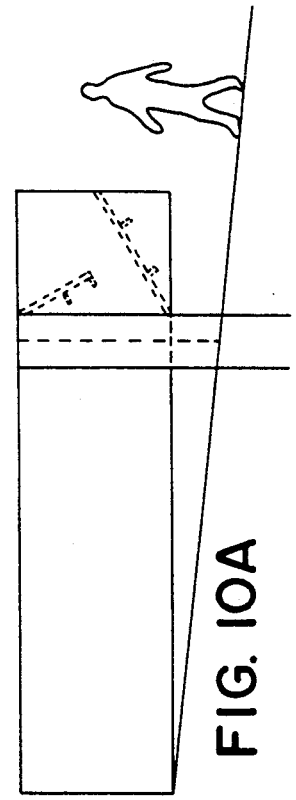
FIG. 10A is a side view of a modification of the apparatus of FIG. 9A.
Figure 10B:
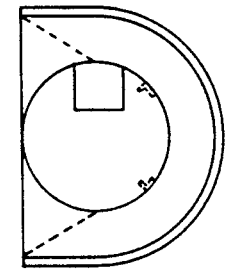
FIG. 10B is an end view of the apparatus of FIG. 10A.
Figure 11C:
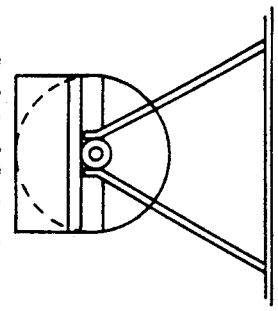
FIG. 11C is an end view of the apparatus of FIG. 11A.
Figure 11D:
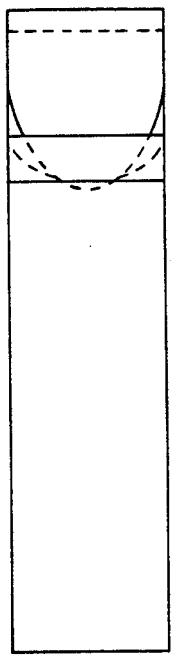
FIG. 11D is a plan view of the apparatus of FIG. 11A.
Figure 11A:
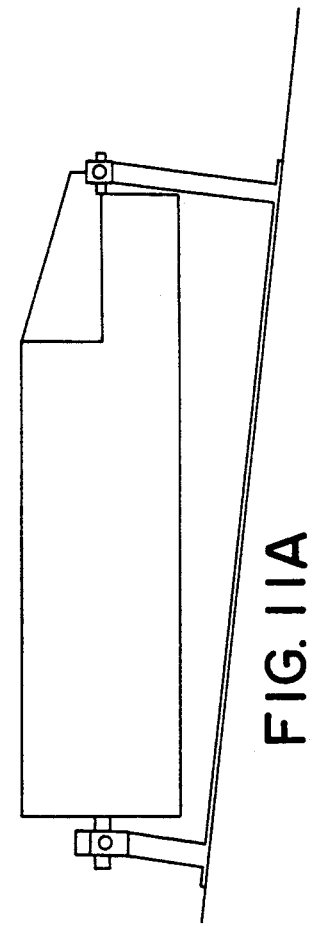
FIG. 11A is a side view of a variant of the construction of the invention.
Figure 11B:
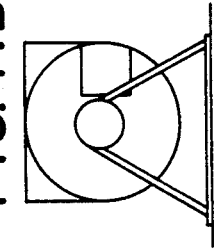
FIG. 11B is an end view of the apparatus of FIG. 11A.
Figure 12D:
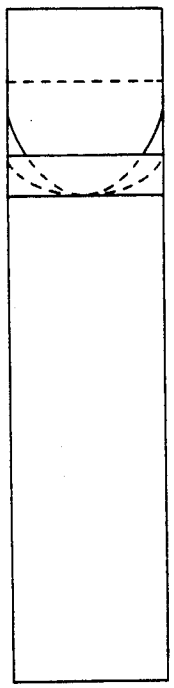
FIG. 12D is a plan view of the apparatus of FIG. 12A.
Figure 12E:
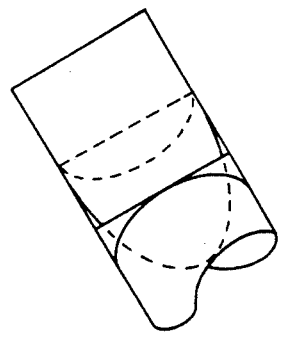
FIG. 12E is a detail of the apparatus of FIG. 12A.
Figure 12C:
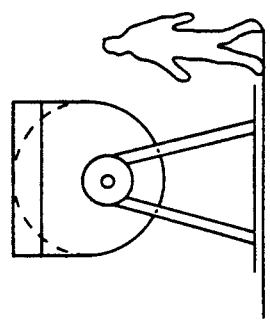
FIG. 12C is an end view of the apparatus of FIG. 12A.
Figure 12A:
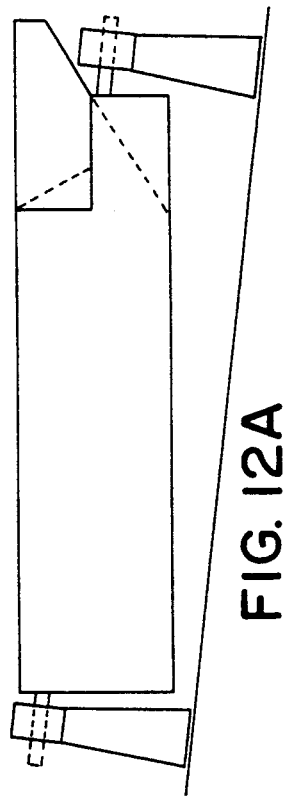
FIG. 12A is a side view of a modification of the apparatus of FIG. 11.
Figure 12B:
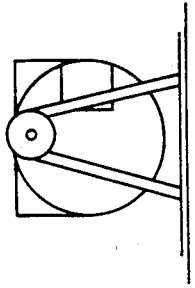
FIG. 12B is an end view of the apparatus of FIG. 12A.
Figure 13C:
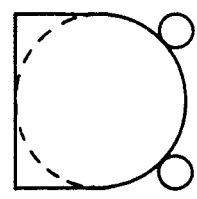
FIG. 13C is an end view of the apparatus of FIG. 13A.
Figure 13D:
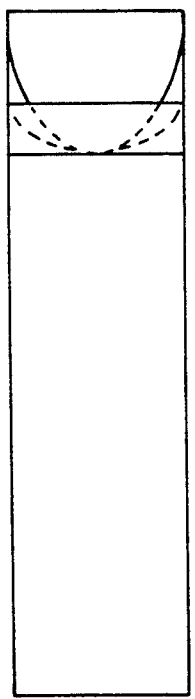
FIG. 13D is a plan view of the apparatus of FIG. 13A.
Figure 13A:
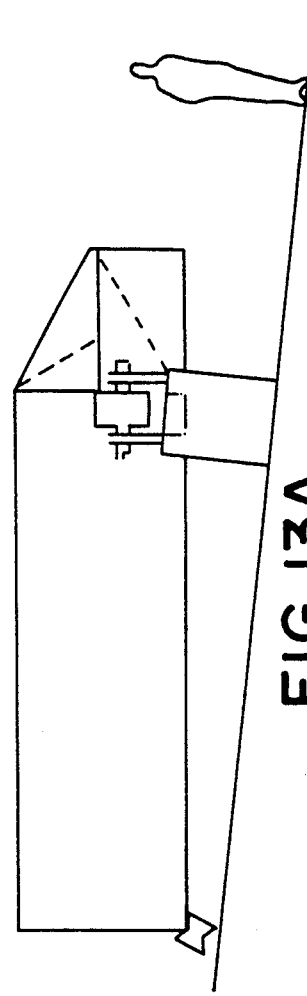
FIG. 13A is a side view of a modification of the apparatus of FIG. 11.
Figure 13B:
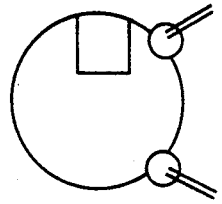
FIG. 13B is an end view of the apparatus of FIG. 13A.

There may be no need to tilt the two halves of the platform. The purpose of the tilt toward the center was to provide a centering moment, but since the whole device is so heavy, it will be controlled with the cables and winch. (There should be stops at the outer edges of the platform to keep the tank from rolling off in the event the winch didn't shut off in time.) Such a construction is shown in FIG. 8. The tank should be filled with fresh water to avoid an accident during the cutting of the input and discharge openings. It has been shown that the tanks are strong enough to take a full load of water without collapsing. If the cutting is done during the winter, the drawing of the fill-water should not create a shortage in summer communities such as Cuttyhunk.

The invention comprehends the following features:
1. The feature of rolling a little more than half the circumference on the tilted platform (large units, 5000 gallons)(120° in each direction).
2. The feature of rolling on the lower circumference at the discharge end and a shaped piece of plywood or other material attached to the high end, (which in fact, raises that end).
3. The feature of rolling on rollers or wheels placed to tilt the axis about 5°.
4. The feature of slots cut along the two elements of the cylinder at the 3 o'clock and 9 o'clock positions in order to trap rainwater and direct it into the composting material.
5. The feature of a few holes on those two same elements, and a steel angle welded to the outside, parallel to those elements to catch rainwater and to direct it into those holes.
6. The feature of rocking back and forth with the two ends constrained with cables fastened to the base and to the body of the cylinder, so that neither end could roll further than the other, and thus get skewed from the proper position.
7. The feature of having a hopper at the high end to catch trash from a dump truck.
8. The feature of rolling the cylinder in either direction by pulling on a cable fastened to the cylinder and passed over it before going to the pulling device.

All of these features are described in order to differentiate the mechanism from well known processing cylinders for this and other purposes, which rely on sophisticated trunions or bearings. The composting devices described herein are all modest, low-technology units, designed to be built almost anywhere with very simple tools and equipment. The purpose of the project is to allow both individuals and communities to build and operate simple composting equipment to digest garbage, paper trash, and with safeguards, septage. The advantage of this equipment is that is makes it very easy to turn over the composting material. The alternate method is called "windrowing", in which tractors or special machines turn long piles of material over from time to time.

Referring now to FIGS. 9A, 9B, 9C, 9D and 9E, therein is shown a modification of the tank of FIG. 6, having an improved chute arrangement. The input end of the tank is cut away at the top half in order to create an input aperture, and a semi-elliptical chute is supported upon the bottom half of the input end of the tank. The chute is semi-elliptical so that it can fit within the wall of the tank and be supported thereby. A chute-roof is affixed to the top half of the cut-away portion of the input end of the tank as shown. Since the chute-roof need not fit within the tank wall, it can be rectangular or semi-elliptical or any other suitable shape. The chute and the chute-roof may be reinforced by suitable angles. Use of the chute construction of FIG. 9 permits complete rotation of the tank without loss of an of the contents thereof, since the chute and the chute-roof combine to keep the contents within the tank whatever its rotational position may be.

Referring now to FIGS. 10A, 10B, 10C, 10D and 10E, therein is shown a modification of the tank of FIG. 9, having a wheel-type plate for the purpose of causing rocking movement.

FIGS. 11-13 illustrate a variant of the construction of the invention, in which the tank is supported upon bearings, so that there is no arcuate member upon which relative movement between the tank and the ground occurs. Such a construction is not confined to rocking oscillatory motion, but permits the use of any type of rotational motion which may be desired.

Referring now to FIG. 11 (FIGS. 11A, 11B, 11C and 11D) therein is shown a construction in which the tank is supported upon its axis by bearings, so that the tank may be rotated about its axis by any of the sources of motive power hereinbefore mentioned.

FIG. 12 (FIGS. 12A, 12B, 12C, 12D and 12E) shows a modification of the construction of FIG. 11, in which the bearings are mounted in such a way that the tank does not rotate about its own axis, but rather about an axis at an angle thereto. Such an arrangement permits rocking motion of the tank, since the asymmetry of distribution of mass about the axis of rotation produces a pendulum-type effect in which the tank always seeks its position of stable equilibrium.

In the construction of FIG. 13 (FIGS. 13A, 13B, 13C and 13D) the roller bearings are mounted on the ground so as to support the tank at the peripheral surface thereof. The roller bearings at the input end of the tank primarily provide support for the weight of the tank so as to lift it, whereas the bearings at the output end of the tank primarily provide resistance to lateral thrust of the tank.

Figure 14:
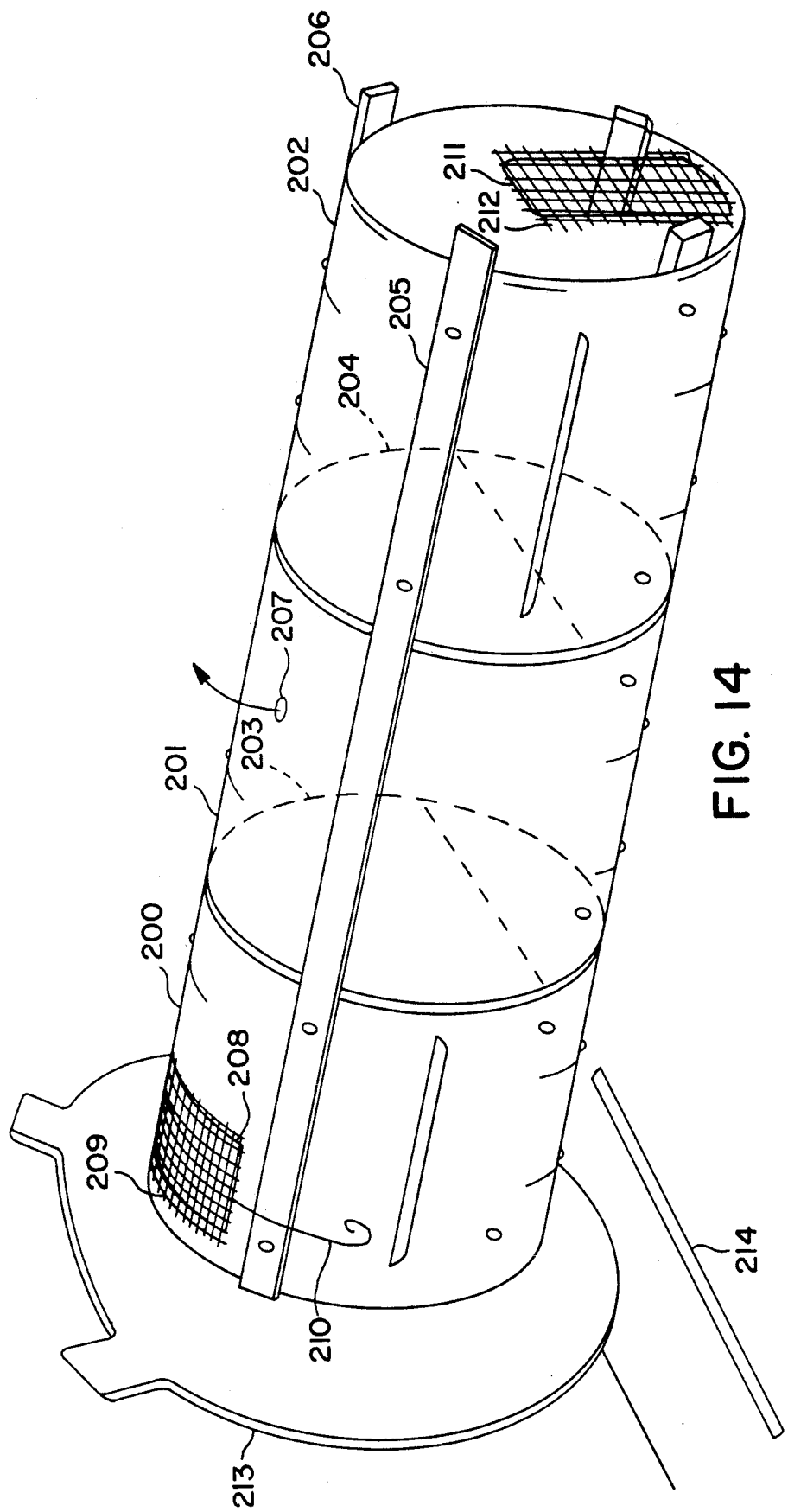
FIG. 14 is a view, similar to that of FIG. 3, showing a three-barrel unit made to produce biogas.
Figure 15:
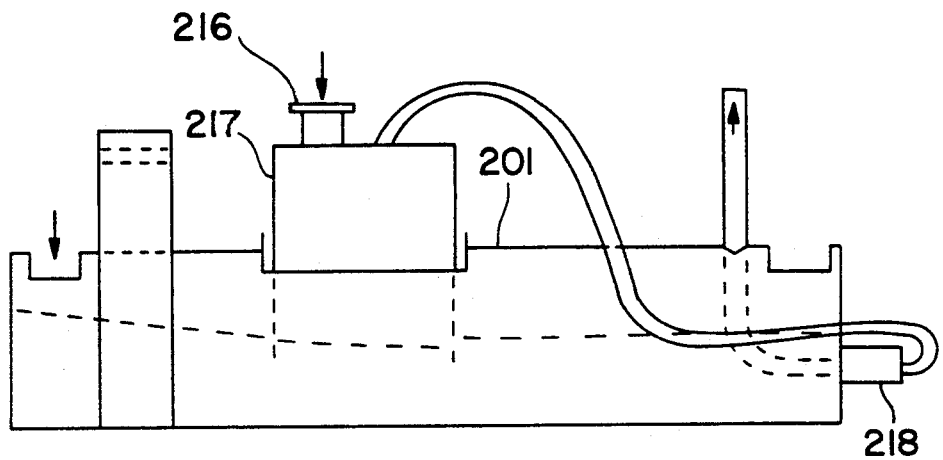
FIG. 15 is a somewhat diagrammatic view of the apparatus of FIG. 14.
Figure 16:
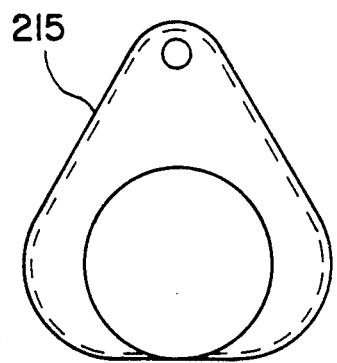
FIG. 16 is an end view of a modification of a portion of the apparatus of FIG. 14.

FIG. 14 is a view, similar to that of FIG. 3, showing a three-barrel unit made to produce biogas. FIG. 15 is a somewhat diagrammatic view of the apparatus of FIG. 14, and FIG. 16 is an end view of a modification of a portion of the apparatus of FIG. 14. Biogas is the gas which is produced during the composting process, and comprises primarily methane. The three barrels 200, 201, 202 of FIG. 14 are assembled in much the same manner as those of FIG. 3. However, the compartment walls 203, 204 which separate the barrels 200, 201, 202 are open at the bottom rather than at the top, and in affixing the outside two-by-fours 205, 206 to the barrels 200, 201, 202 no fasteners are used in the top half of the center barrel 201. An aperture 207 is provided in the upper portion of the center barrel 201 for the release of biogas. The input 208 is covered with hardware cloth 209, which may be of half-inch mesh, and which is held in place with shock cord 210. The output 211 is covered with hardware cloth 212 held on with sheet metal screws and washers (not shown).

The wheel 213 for raising the input end and for providing rock and roll motion may be constructed of plywood and may have a two-foot radius. A hard surface 214 may be provided under the wheel 213 for it to roll on. Alternatively, the wheel 213 may be of varying radius, and have a somewhat triangular shape, as shown at 215 in FIG. 16, so that the composter barrels 200, 201, 202 are in an "at rest" position when in the position shown in FIG. 16, and also when in the two "120°" positions, in which the wheel has been rotated through 120° from the ground position in either direction. The center barrel 201 may be provided with a sealed input 216 for the admission of septage. This sealed input may be provided in a chamber 217 which has adjustable height. The composting in the center barrel 201 thus is anaerobic. Because of the stability of the unit at the 120° positions, it is possible to rake out the compost when the composter is in either of these positions. A burner 218 may be provided to kill pathogens, making use of the biogas generated in the center barrel 201.

Thus the tank 200-202 of FIG. 14 has adjustable curtain walls 203, 204 which hang down into the composting materials in such a way as to provide an airtight chamber in the middle section along the length of the tank 200-202, in which, because of restricted supply of oxygen, the composting process is anaerobic, thereby producing combustible gases which can be burned in an enclosure 218 (FIG. 15) near the second end of the tank 200-202 for the purpose of heating the final product to destroy pathogens. Since this chamber is isolated from the atmosphere, it can accept septage and other odiferous materials without exposing the noxious fumes to the public.

Figure 19:
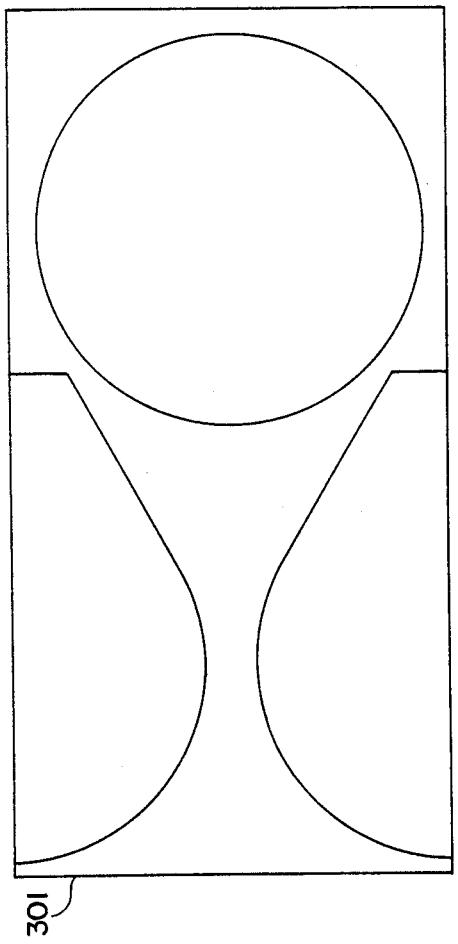
FIGS. 17-19 illustrate the manner of construction of a simple one-barrel unit.
Figure 17:
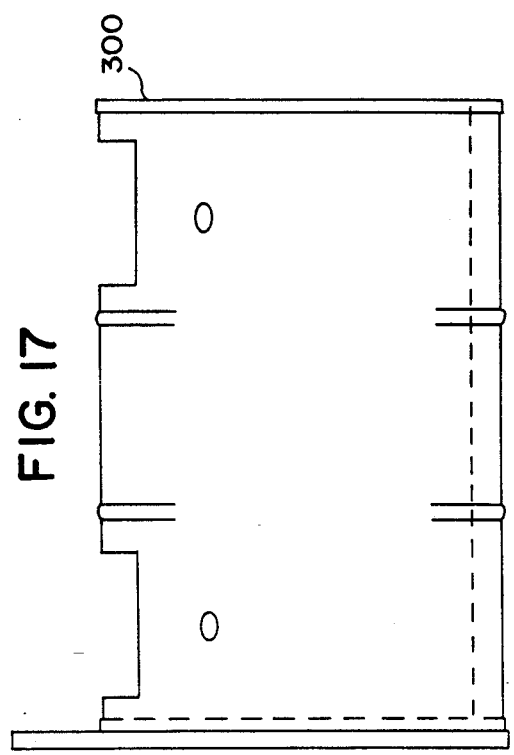
Figure 18:
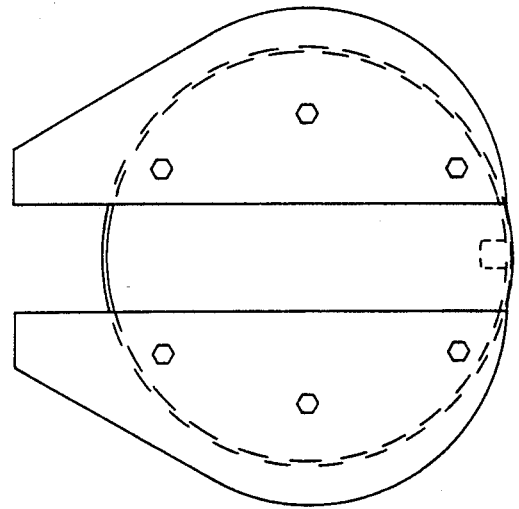
Figure 20:
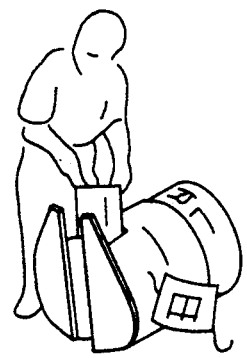
FIGS. 20-22 illustrate the manner of use of a simple one-barrel unit.
Figure 21:
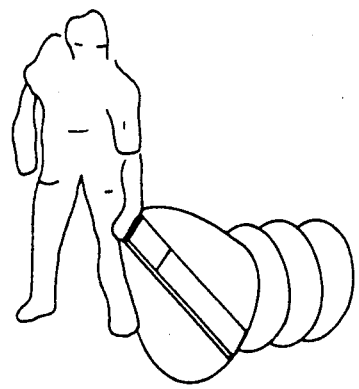
Figure 22:
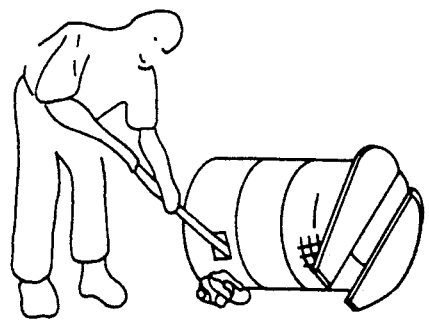

FIGS. 17-19 illustrate the manner of construction of a simple one-barrel unit, and FIGS. 20-22 illustrate the manner of its use. The unit may be constructed from a single reconditioned, used drum 300 and a two-foot by 4-foot sheet 301 of $\frac{3}{4}$ inch plywood shown in FIG. 19, together with:

$\frac{3}{8}" \times 3"$ long hex bolts, or carriage bolts, with washers and nuts;

$1\frac{1}{4}$ inch square, pine balluster, 3 feet long; two pieces of $\frac{1}{2}$ inch mesh hardware cloth $12" \times 15"$. (All four edges should be folded in 1-inch over a piece of window screening $10" \times 13"$);

2 inch wide heavy, cloth tape (to further bind screens); two 16" long shock cords or luggage straps;

$1\frac{1}{4}"$ long #6 or #8 dry-wall screws (to join plywood parts and to secure balluster, tumbling rod);

$1\frac{1}{4}$ long nails to hold plywood parts in position for screwing; 1 quart of green house paint or enamel for plywood and barrel.

The only tools required are:

Electrical drill and $\frac{1}{2}$ inch metal drill bit and Phillips screw driver bits Sabre saw, or cold chisel and hammer (to cut openings). Wrenches for 154 " bolts and nuts.

The construction is carried out in the following manner:

A 22" diameter spacer and two half-wheels are cut from $\frac{3}{4}$ inch plywood; they are sealed, primed and painted. The half-wheels are nailed to the round spacer, 6 inches apart. $8" \times 8"$, or 8" diameter openings are cut at each end of the top curved surface of a 55 gallon barrel. Holes are drilled in the wheel-spacer sub-assembly, and it is bolted to the input end of the composter. The input and discharge openings are covered with $10" \times 13"$ half-inch galvanized, hardware cloth-plus-window-screening, bound with adhesive cloth tape, and secured with 16" long, flat, rubber, luggage straps, hooked into holes drilled into the barrel. The composter is loaded at the wheel-end; compost is raked out from the other end.

The unit thus constructed may be used in the following manner:

This one-family-size composter is easy to build, and even easier to use. Kitchen garbage and garden refuse are dropped in at the head end, where the wheel segments raise that end slightly whenever the barrel is rocked. Compost is removed at the other end, so the operation is continuous, rather than batch. The sketches of FIG.S 20-22 illustrate the three key steps:

1. Uncover the input opening and drop in garbage (FIG. 20).
2. Reclose the input opening with screen (held in place with shock cord.)
3. Rock and roll the composter in both directions to mix the ingredients (FIG. 21). As the wheel segments lift the input end, some material tumbles gently toward the discharge end.
4. When the compost seems ready, unhook the shock cord holding the screen over the discharge opening, and rock the composter as far as it will go in either direction. It will remain in that position while you scoop out the compost (FIG. 22).
5. Rock the unit back to the vertical, and horizontal position, and replace the screen over the discharge opening.

The screens are vermin-proof, so it is possible to compost meat if desired. It may be desirable to keep some fresh vegetable material, including seaweed, in a circular, wire bin to cover up the new garbage in the composter. Having thus described the principles of the invention, together with several illustrative embodiments thereof, it is to be understood that although specific terms are employed, they are used in a generic and descriptive sense, and not for purposes of limitation, the scope of the invention being set forth in the following claims.

I claim:

1. A composter for composting compostable material comprising in combination a cylindrical tank having a first end and a second end and a cylindrical surface, said tank having an entrance aperture near its first end and an exit aperture near its second end, an external support which maintains said first end in a position which is not lower with respect to said second end, said support having a stationary surface with a curvature less than that of the cylindrical surface of said tank, at least some portion intermediate the ends thereof being horizontal, said cylindrical surface of said tank being in direct rolling contact with said surface of said support throughout rocking translational movement of said tank, and means to hinder axial movement of said tank, said tank being readily responsive to external initiation of rocking, translational movement of said tank with respect to ground on an interface which includes said surface, whereby said tank is caused to roll on said surface in rocking translational movement in response to external initiation, whereby said tank performs said rocking translational movement after said external initiation, causing the materials inside to be tumbled, mixed and aerated to promote composting, wherein said tank has adjustable curtain walls which hang down into the composting materials in such a way to provide an airtight chamber in the middle section along the length of said tank in which because of restricted supply of oxygen, the composting process includes at least one anaerobic interval process, thereby producing combustible gases, said airtight chamber having an aperture for the release of said combustible gases, said tank having an enclosure near the second end thereof, means for conveying said combustible gases from said aperture to said enclosure for the purpose of burning said combustible gases so as to heat the final product to destroy pathogens, and said chamber being isolated from the atmosphere can accept septage and other odiferous materials without exposing the noxious fumes.

2. A composter according to claim 1, wherein said tank is a single barrel unit.

3. A composter according to claim 1, wherein said tank is a unit comprising several barrels assembled end-to-end and mutually separated by end-walls having an upper portion and a lower portion.

4. A composter according to claim 3, wherein openings between barrels are provided, said openings being in the end-walls of the middle barrel(s) nearer the upper portion than to the lower portion, so that the compostable material falls over each wall into the next barrel.

5. A composter according to claim 1, wherein said tank is a underground fuel tank unit.

6. A composter for composting compostable material comprising in combination a cylindrical tank having a first end and a second end and a cylindrical surface, said tank having an entrance aperture near its first end and an exit aperture near its second end, and a wheel attached to its first end which wheel being in direct rolling contact with the horizontal ground throughout rocking and translational movement of said tank, said tank being readily responsive to external initiation of rocking, translational movement of said tank with respect to ground, whereby said tank is caused to roll with the wheel and the cylindrical surface of the second end of said tank in contact with the ground surface in rocking translational movement in response to external initiation, whereby said tank performs said translational movement after external initiation, using gravity to provide a restoring moment to a resting position, and causing the materials inside said tank to be tumbled, mixed and aerated to promote composting, wherein said tank has adjustable curtain walls which hang down into the composting materials in such a way as to provide an airtight chamber in the middle section along the length of said tank in which because of restricted supply of oxygen, the composting process includes at least one anaerobic interval process, thereby producing combustible gases, (i.e. biogas) said airtight chamber having an aperture for the release of said combustible gases, said tank having an enclosure near the second end thereof, means for conveying said combustible gases from said aperture to said enclosure for the purpose of burning said combustible gases so as to heat the final product to destroy pathogens, and said chamber being isolated from the atmosphere can accept septage and other odiferous materials without exposing the noxious fumes.

7. A composter according to claim 6, wherein said tank is a single barrel unit.

8. A composter according to claim 6, wherein said tank is a unit comprising several barrels assembled end-to-end and mutually separated by end-walls having an upper portion and a lower portion.

9. A composter according to claim 8, wherein openings between barrels are provided, said openings being in the end-walls of the middle barrel(s) nearer the upper portion than to the lower portion, so that the compostable material falls over each wall into the next barrel.

10. A composter according to claim 6, wherein said tank is a underground fuel tank unit.

* * * * *